May 18, 1926.
E. V. RONCERAY
1,584,808
ROTARY MOLDING MACHINE
Filed Sept. 6, 1922    4 Sheets-Sheet 1
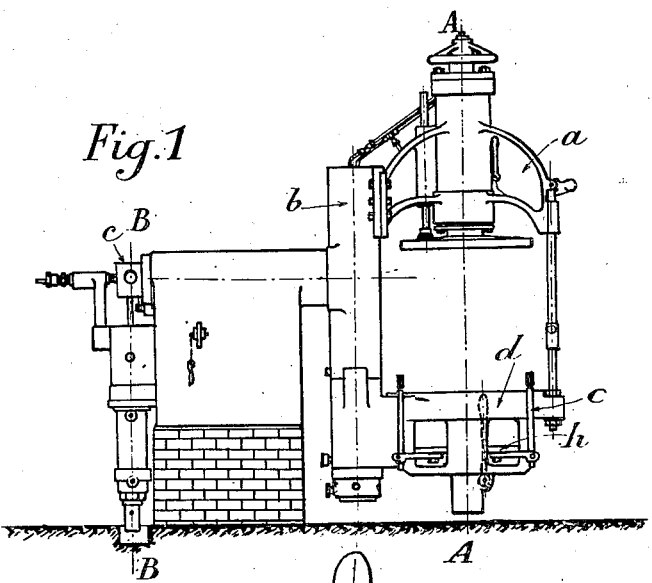
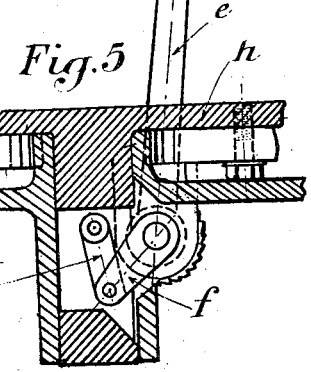
Inventor.
E. V. Ronceray

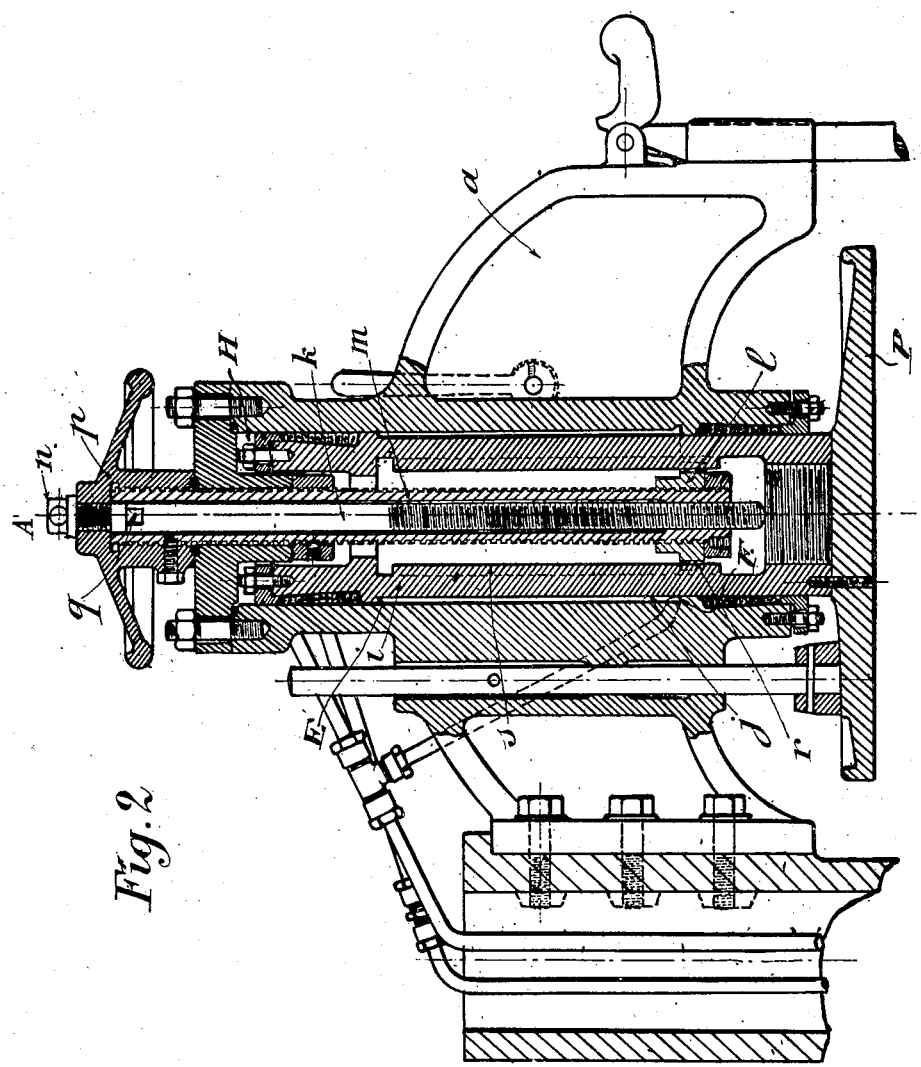

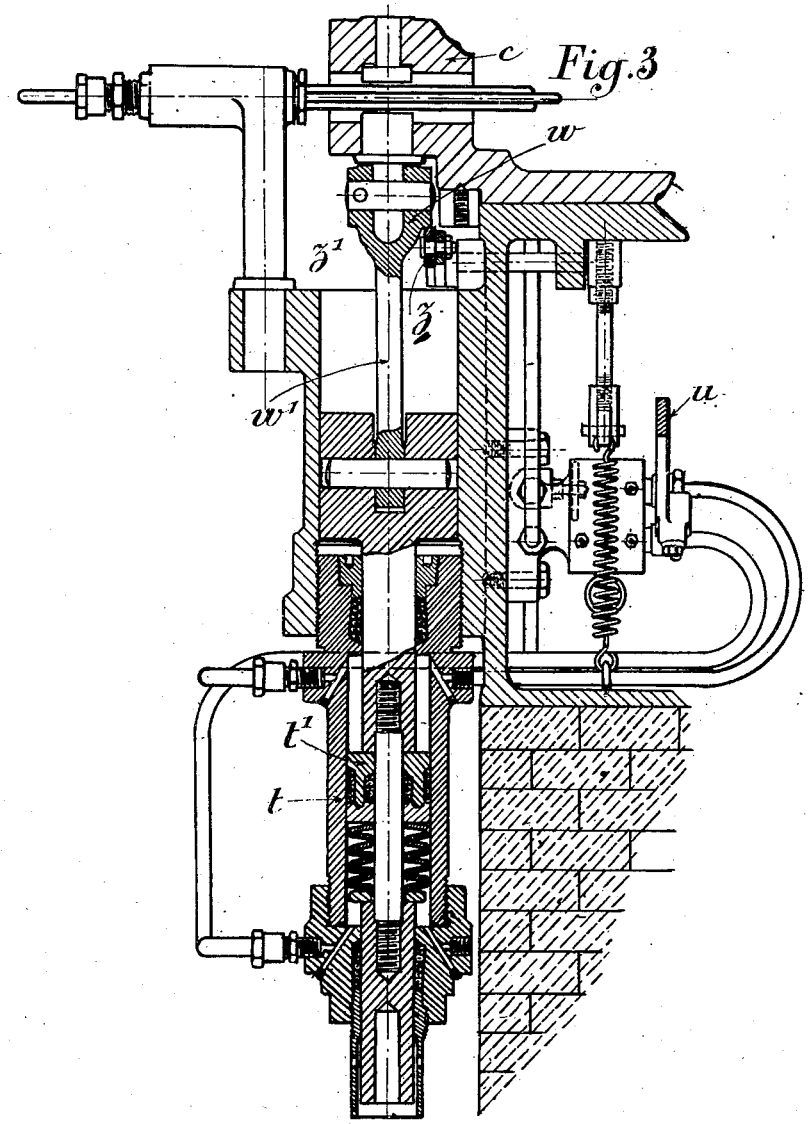

Patented May 18, 1926.  1,584,808

UNITED STATES PATENT OFFICE.

EUGÈNE VICTOR RONCERAY, OF CHOISY LE ROI, FRANCE.

ROTARY MOLDING MACHINE.

Application filed September 6, 1922. Serial No. 586,545.

The present invention relates to a molding machine the characteristic features whereof consist in that the table is movable, while the press head is stationary, an unmolding being effected by hand by means of a suitable braking device; moreover the machine is also provided with a pressing device comprising a stop piece which is regulable for the upward and downward strokes of the piston of the machine, and the rotation of the engine is afforded by means of a single cylinder, one rod and one crank instead of two cylinders, a chain and a sprocket wheel as in the known machines.

In the accompanying drawing and by way of example:

Fig. 1 is an elevational view of the whole machine,

Fig. 2 is an axial vertical section of the press head on the line A—A (Fig. 1) on a larger scale.

Fig. 3 is a vertical section of the driving device on the line B—B (Fig. 1).

Fig. 5 is a vertical sectional view through the axis of the guiding piston of the unmolding plate and showing the device which permits unmolding by hand and which is provided with a suitable brake.

Figure 4:
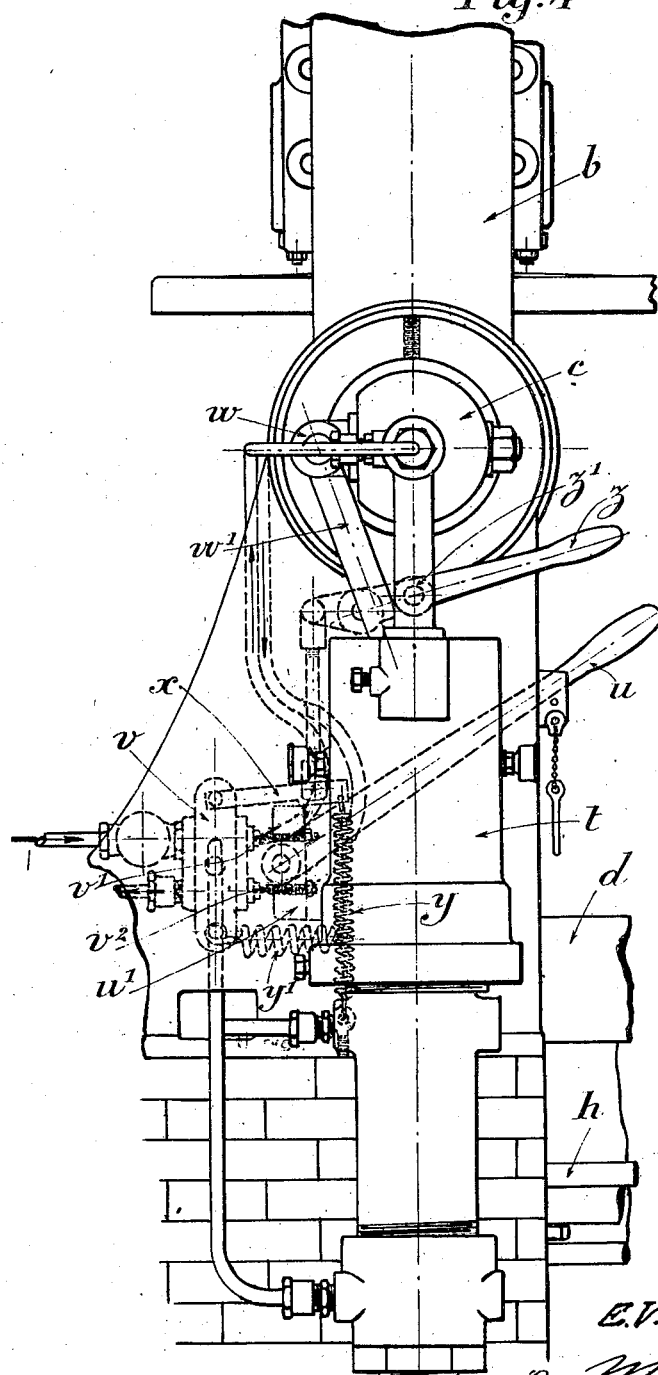
Fig. 4 is a side elevation of the same.

As shown in the drawing, the press head $a$ is bolted upon the pivoted support $b$ which may rotate about its lateral horizontal extension $c$. The table $d$ is adapted to pivot about said support $b$ in order to be turned out, when said table is in its upper position as well as, when it is in its lower position.

Unmolding by hand without turning over the support $b$ is effected by means of a lever $e$ connected by the crank $f$ to the rod $g$ whereby the unmolding plate $h$ may be lifted and this device is provided with a brake of the kind of the ratchet device or friction ratchet gear or the like, so that when the lever $e$ is released, the unmolding plate $h$ may remain in position under the effect of the load, whatever may be the position of the table.

It is to be noted that the brake of the unmolding device may be as well used with an unmolding device comprising a toothed pinion engaging a rack bar.

The molding and unmolding operations of the pressing plate P are obtained by means of a differential piston $i$; the fluid under pressure used, acts permanently upon said piston within the annular chamber $j$ surrounding the same for effecting the upward stroke of said piston. For effecting the downward stroke, water under pressure is admitted at will above the piston, into the upper chamber H of the cylinder. Since the surface of the upper face of the piston, equal to the cross section of the cylinder bore, is larger than the annular area of the end faces E and F of the said annular chamber $j$ the pressure force causing the downward stroke of the piston will be much greater than the constant force tending to lift the same, and the difference between these two forces will be adjusted in order to obtain the required pressing of the sand within the molding frame. At the end of the upward stroke the piston $i$ abuts against a central screw $k$, and at the end of the downward stroke the piston meets the nut $l$ which may be screwed upon the screw $m$ surrounding the central screw $k$. The position of said screw $k$ may be varied by unscrewing the upper plug $n$ screwed into the central bore of the handwheel $p$ by means of which the pressing action may be regulated as will be set forth hereinafter; said plug $n$ having been removed the central screw $k$ is rotated by means of a socket wrench which may engage a square hole $q$ provided at the upper end of the screw $k$.

The regulation of the length of the downward stroke is effected by rotating the hand wheel $p$ secured to the annular screw $m$, while the nut $l$ is prevented from rotating by two longitudinal lugs $s$ integral with the inner part of the piston $i$ and which engage two grooves $r$ provided in said nut.

The rotation of the machine in case the unmolding operation should require it is obtained by means of a piston $t^1$ which moves within a cylinder $t$ under the action of water under pressure which is admitted first at the upper part of said cylinder, and then at its lower part while the water admitted at the upper part is evacuated.

This is effected by means of a hand lever $u$ controlling a distributor $v$ adapted to direct the water to the upper part and to the lower part of the cylinder $t$ successively.

For this purpose, a cam $u^1$ is secured to the lever $u$, and said cam is adapted to operate in one position the valve $v^1$ of the distributor $v$ which controls the admission of water into the upper parts of the cylinder $t$, and in the other position the valve $v^2$ of the same which controls the admission of the water at the lower part I of the cylinder $t$. The cam $u^1$ is locked in the first position by a hooked piece $x$ which is constantly drawn downwardly by a spring $y$; a two arm lever $z$ pivoted about an axle R carries on one of its arms a roller $z^1$ which is on the way of the cross head $w$ of the connecting rod connected to the piston $t^1$ by means of the connecting rod $w^1$; the end of the other arm of the lever $z$ is connected by means of a rod T to the end of the said hooked piece $x$.

The operation of the device is as follows: When the machine is in the starting position with its table $d$ at the lower part as shown on Fig. 1, the piston $t^1$ is at the end of its upward stroke, i. e. at the top of the cylinder $t$ and the connecting rod $w^1$ occupies the position shown on Fig. 4. To rotate the support $b$ together with the press head $a$ and the table $d$, the lever $u$ is raised, which rotates the cam $u^1$. The latter is locked by the hooked piece $x$ impelled downwardly by the spring $y$; in this position, the cam $u^1$ pushes in a constant manner the valve $v^1$ of the distributor $v$, so that water under pressure is led into the upper part S of the cylinder $t$. Now the piston $t^1$ will descend and, by means of the connecting rod $w^1$, rotate the support $b$ about a quarter of a revolution. When arriving at the end of its downward stroke, and immediately before reaching this position, the cross head $w$ of the connecting rod $w^1$ strikes the roller $z^1$, carried by the lever $z$. The latter pivots about its axis R, thus raising the hooked piece $x$, which releases the cam $u^1$ set under the action of the spring $y^1$. This cam is now rotated by this spring, thus releasing the valve $v^1$ for putting the upper chamber S of the cylinder $t$ in communication with the outlet, and pushing the valve $v^2$ for admitting water under pressure into the lower part I of the said cylinder, under the piston $t^1$. Consequently the piston $t^1$ will rise and, through the medium of the connecting rod $w^1$, cause the support $b$ to rotate about a further quarter of a revolution. Now the table $d$ has reached the upper position and the press head $a$ the lower position. The operation of returning the machine into the starting position is the same as the preceding but the connecting rod $w^1$ effecting a reverse movement.

The operation and function of the machine as a whole is as follows: A pattern plate is secured upon the table $d$ and the required flasks are laid upon the unmolding rods C carried by the unmolding plate $h$. Sand is poured into said flasks in the usual manner. Then, water under pressure is admitted into the chamber H of the press head, this causing the pressing plate P to lower and to press the sand within the flasks. This being effected, and in order to carry out the unmolding operation by hand, the chamber H is connected with the outlet which causes the piston to rise in the above described manner. By acting on the lever $e$, the frame together with the mold are raised through the medium of table $h$ and unmolding rods C. The mold being thus released from the pattern plate is now removed and the machine is ready for a next operation.

If the mold comprises a heavy core that would afford difficulties in unmolding by hand, after the pressing plate P having pressed the sand the support $b$ is rotated about a half of a revolution and unmolding is effected by simply connecting the chamber H to the outlet thus allowing the plate P to descend together with the mold. If necessary the releasing of the mold from the pattern plate may be aided by acting on lever $e$, thus causing the unmolding rods C to push down the flasks of the mold.

Having now described my invention, what I claim as new and desire to secure by Letters Patent is:

1. A rotary molding machine comprising a vertical rotatable support, a movable table adapted to pivot about one end of said support and provided with an unmolding plate, a stationary press head secured on the other end of said support and comprising a cylinder, a piston movable within said cylinder and adapted to exert the pressing action towards the table and to be raised thereafter for permitting the unmolding, means for lifting said unmolding plate and means for rotating said support about a horizontal axis.

2. A rotary molding machine comprising a vertical rotatable support, a movable table adapted to pivot about one end of said support and provided with an unmolding plate, a stationary press head secured on the other end of said support and comprising a cylinder, a piston movable within said cylinder and adapted to exert the pressing action towards the table and to be raised thereafter for permitting the unmolding, means embodying a lever and a crank for lifting said unmolding plate, said means being provided with a braking device, means for lifting said unmolding plate and means for rotating said support about a horizontal axis.

3. A rotary molding machine comprising a vertical rotatable support, a movable table adapted to pivot about one end of said support and provided with an unmolding plate, a stationary press head secured on the other end of said support and comprising a cylinder, a piston movable within said cylinder and adapted to exert the pressing action towards the table and to be raised thereafter for permitting the unmolding, means comprising two regulable stop pieces within said cylinder for regulating the upward and downward strokes of the piston, means for lifting said unmolding plate, and means for rotating said support about a horizontal axis.

4. A rotary molding machine comprising a vertical rotatable support, a movable table adapted to pivot about one end of said support and provided with an unmolding plate, a stationary press head secured on the other end of said support and comprising a cylinder, a piston movable within said cylinder and adapted to exert the pressing action towards the table and to be raised thereafter for permitting the unmolding, two concentric screws coaxial with the cylinder, a nut screwed on the outer screw and adapted to slide within said cylinder, means for rotating both screws independently from each other, the piston being adapted to come against the inner end of the central screw at the end of its upward stroke, and to come against the nut at the end of its downward stroke, means for lifting the unmolding plate, and means for rotating said support about a horizontal axis.

5. A rotary molding machine comprising a vertical rotatable support, a movable table adapted to pivot about one end of said support and provided with an unmolding plate, a stationary press head secured on the other end of said support and comprising a cylinder, a piston movable within said cylinder and adapted to exert the pressing action towards the table and to be raised thereafter for permitting the unmolding, means for lifting said unmolding plate, a horizontal shaft carrying said support, means for connecting said shaft to a driving piston which is adapted to move within a second cylinder, and means for admitting a fluid under pressure at each end of said second cylinder alternately.

In testimony whereof I have signed my name to this specification.

EUGÈNE VICTOR RONCERAY.